(12) United States Patent
Hsu et al.

(10) Patent No.: US 7,093,140 B2
(45) Date of Patent: Aug. 15, 2006

(54) METHOD AND APPARATUS FOR CONFIGURING A VOLTAGE REGULATOR BASED ON CURRENT INFORMATION

(75) Inventors: Pochang Hsu, Fremont, CA (US); Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 616 days.

(21) Appl. No.: 10/187,217

(22) Filed: Jun. 28, 2002

(65) Prior Publication Data

US 2004/0003310 A1 Jan. 1, 2004

(51) Int. Cl.
*G06F 1/26* (2006.01)

(52) U.S. Cl. .................. 713/300; 713/321; 713/324; 713/340; 315/291; 315/301; 315/307; 315/308; 361/18; 340/693.4

(58) Field of Classification Search ............... 713/300, 713/321, 324, 340; 315/291, 301, 307, 308; 361/18; 340/693.4
See application file for complete search history.

(56) References Cited

U.S. PATENT DOCUMENTS

| | | | | |
|---|---|---|---|---|
| 4,346,342 A | * | 8/1982 | Carollo .................. | 323/276 |
| 4,695,737 A | * | 9/1987 | Rabon et al. ............. | 307/31 |
| 5,013,995 A | * | 5/1991 | Rashid .................... | 322/25 |
| 5,294,879 A | * | 3/1994 | Freeman et al. .......... | 322/23 |
| 5,714,873 A | | 2/1998 | Hwang | |
| 5,774,734 A | * | 6/1998 | Kikinis et al. ............. | 713/300 |
| 5,919,262 A | * | 7/1999 | Kikinis et al. ............. | 713/300 |
| 5,926,394 A | * | 7/1999 | Nguyen et al. ............ | 716/1 |
| 6,147,847 A | * | 11/2000 | Hochgraef et al. ........ | 361/93.2 |
| 6,229,292 B1 | * | 5/2001 | Redl et al. ................ | 323/285 |
| 6,233,625 B1 | | 5/2001 | Vander Kamp et al. | |
| 6,310,792 B1 | * | 10/2001 | Drobnik .................... | 363/147 |
| 6,472,899 B1 | * | 10/2002 | Osburn et al. ............. | 324/765 |
| 6,566,848 B1 | * | 5/2003 | Horigan et al. ............ | 323/283 |
| 6,772,356 B1 | * | 8/2004 | Qureshi et al. ............ | 713/321 |
| 6,839,854 B1 | * | 1/2005 | Nguyen ..................... | 713/300 |
| 6,874,083 B1 | * | 3/2005 | Sarangi et al. ............. | 713/100 |
| 6,883,152 B1 | * | 4/2005 | Bednar et al. ............. | 716/5 |

FOREIGN PATENT DOCUMENTS

| WO | WO 96/13100 | 5/1996 |
|---|---|---|
| WO | WO 01/73532 A2 | 10/2001 |
| WO | WO 02/08874 A2 | 1/2002 |

OTHER PUBLICATIONS

"How To Modify A Voltage Regulator Module For An Intel Pentium II", IBS Research Disclosure, vol. 1515, No. RD41586, Nov. 1998, XP002289215.

* cited by examiner

*Primary Examiner*—Lynne H. Browne
*Assistant Examiner*—Nitin C. Patel
(74) *Attorney, Agent, or Firm*—Blakely, Sokoloff, Taylor & Zafman LLP

(57) ABSTRACT

A computer system includes a voltage regulator that supplies power to a component. The component may provide a signal indicating an amount of current the component consumes under a high utilization operating condition. The voltage regulator may then determine the slope of a load line using this signal.

19 Claims, 3 Drawing Sheets

METHOD AND APPARATUS FOR CONFIGURING A VOLTAGE REGULATOR BASED ON CURRENT INFORMATION

The present invention relates to computer systems and more particularly to reducing the power consumed by a computer system by automatically adjusting a load line of a voltage regulator.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. Computer systems typically include one or more processors. A processor manipulates and controls the flow of data in a computer by executing instructions. To provide more powerful computer systems for consumers, processor designers strive to continuously increase the operating speed of the processor. Unfortunately, as processor speed increases, the power consumed by the processor tends to increase as well.

Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

One method of reducing the amount of electric power drawn by a computer system is to design the voltage regulator (alternatively referred to as the power supply/ source, voltage supply/source, or Vcc supply/source) to operate according to a particular load line. The load line may be designed to meet the specified supply voltage and supply current characteristics of a component.

Unfortunately, not all components have identical characteristics. For example, processors operating at different frequencies tend to exhibit different current consumption characteristics. Thus, a load line of a voltage regulator appropriate for supplying power to one component may not be appropriate for supplying power to another component.

One or more embodiments of the present invention may address this and other issues associated with the prior art.

BRIEF DESCRIPTION OF THE DRAWINGS

Embodiments of the present invention are illustrated by way of example and not limitation in the accompanying figures in which like references indicate similar elements and in which.

It is to be noted that the elements of the figures may not be drawn to scale relative to one another.

DETAILED DESCRIPTION

In accordance with an embodiment of the present invention, a computer system includes a voltage regulator that supplies power to a component such as a processor. The processor may provide a signal indicating an amount of current the processor consumes under a high utilization operating condition. The voltage regulator may then determine the slope of a load line using this signal. A more detailed description of embodiments of the present invention, including various configurations and implementations, is provided below.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Figure 1:
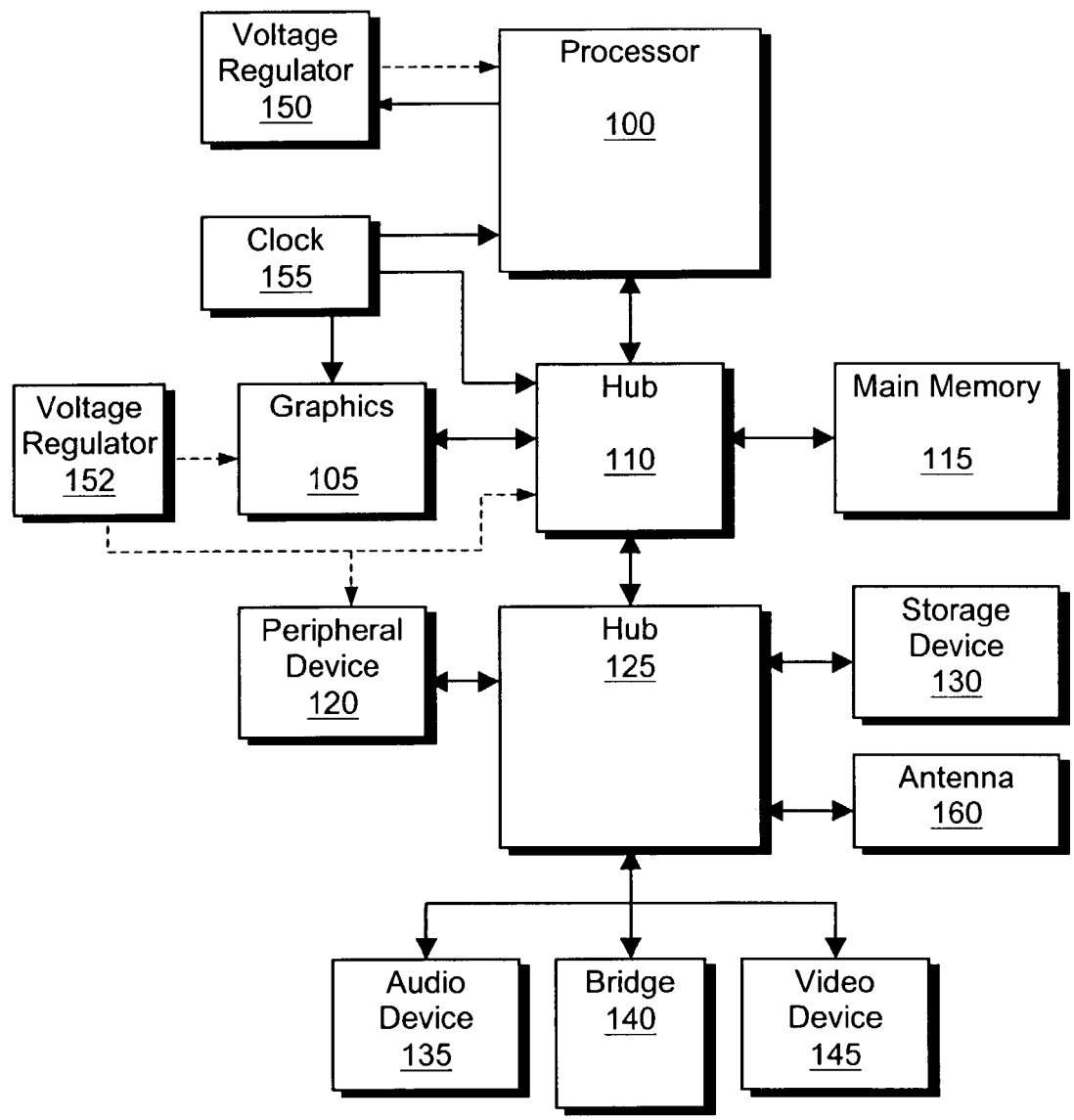
FIG. 1 includes an example of a computer system.

FIG. 1 includes an example of a computer system. As shown, the computer system may include a processor 100 coupled to hub 110 and to voltage regulator 150. Voltage regulator 150 may supply power to processor 100 and may receive a signal from processor 100 indicating an amount of current processor 100 may consume. Clock 155 may provide a clock signal to processor 100. Processor 100 may communicate with graphics controller 105, main memory 115, and hub 125 via hub 110. Hub 125 may couple peripheral device 120, storage device 130, audio device 135, video device 145, antenna 160, and bridge 140 to hub 110. Voltage regulator 152 may supply power to graphics controller 105, peripheral device 120, and hub 110.

Audio device 135 of FIG. 1 may include, for example, a speaker, a microphone, or other input/output device. Video device 145 may include, for example, a display screen, a camera, or other video input/output device. Bridge 140 may couple hub 125 to one or more additional buses coupled to one or more additional peripheral devices. Antenna 160 may couple the computer system to one or more wireless networks in accordance with one or more wireless communication protocols. Peripheral device 120 may be one or more other peripheral devices.

Voltage regulators 150 and 152 of FIG. 1 (as well as others that may not be shown) may supply power to one or more components of the computer system. The voltage regulators may also receive signals indicating an amount of current that may be consumed by the one or more components powered by the voltage regulators. A signal that indicates the amount of current that may be consumed by a component may be referred to as a supply current identification signal, or "IccID". Similarly, the voltage regulators may receive signals indicating a proper supply voltage level that may be supplied to the one or more components powered by the voltage regulators. A signal that indicates the proper supply voltage level that may be supplied to a component may be referred to as a supply voltage identification signal, or "VccID".

In accordance with an embodiment, a computer system may include more or fewer components than those shown in FIG. 1, and the components of FIG. 1 may be partitioned differently. For example, multiple components may be integrated into a single component, and single components may be divided into multiple components. Note that the term "processor" may refer to one or more of a central processing unit, a processor of a symmetric or asymmetric multiprocessing system, a digital signal processor, a micro-controller, etc.

Although embodiments may be described below in association with a processor, it is to be noted that embodiments may be implemented in association with alternate components as well. For convenience, the term "processor" may be used herein to refer not only to a processor, as defined above, but also to other such power demanding components such as a hub (e.g. a bridge, chipset, etc.), memory, or a controller (e.g. a graphics controller, memory controller, etc).

Figure 2:
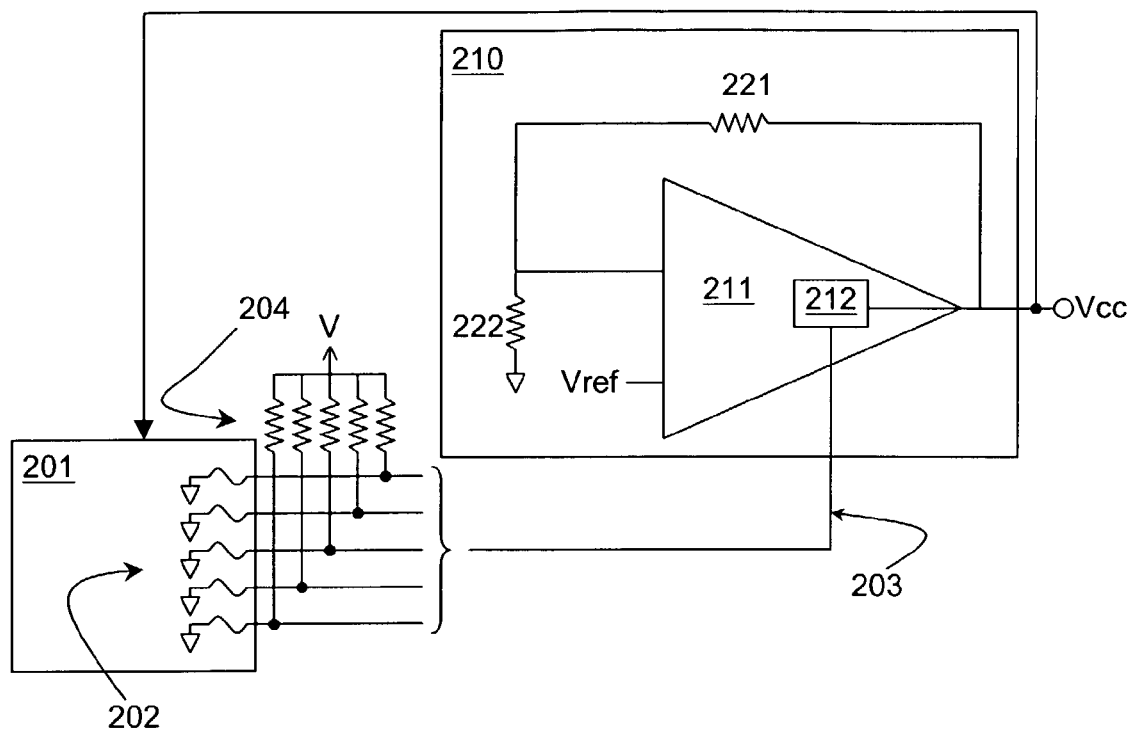
FIG. 2 includes an example of a circuit.

FIG. 2 includes an example of processor 201 coupled to voltage regulator 210 via an IccID signal line 203. For one embodiment, voltage regulator 210 may be a switching regulator. Processor 201 may include a plurality of fuses 202. These fuses may be selectively blown during testing of processor 201 to indicate an amount of current processor 201 is to consume. In accordance with one embodiment, the amount of current indicated by fuses 202 is the amount of current processor 201 consumes under a high utilization operating condition.

A high utilization operating condition may be a condition in which the processor operates at the upper end of its specified frequency range while executing a high volume of instructions. Executing a high volume of instructions may be defined as, for example, retiring an average of at least one instruction per clock cycle. A high utilization operating condition may alternately be defined as a condition in which the processor utilization average is greater than 90% over a period of time. Alternatively, a high utilization operating condition may be defined as a condition in which the processor executes a sufficiently high volume of instructions to cause the processor to quickly ramp up to an upper thermal limit specified for the processor. Executing a software sequence known as a "thermal virus" may achieve this condition. Alternatively, a high utilization operating condition may be a condition in which the processor operates at the upper end of its specified current or power range.

As more fuses 202 of FIG. 2 are employed to encode the amount of current processor 201 consumes, the amount may be encoded with finer granularity. For example, if a single fuse is used, two amounts may be encoded. If two fuses are used, four amounts may be encoded. If three fuses are used, eight amounts may be encoded. And so forth. For an alternate embodiment, the amount of current processor 201 consumes may be encoded within the processor in an alternate manner. For example, the amount may be encoded in an alternate non-volatile memory portion of processor 201, or it may be encoded at the mask level (if it is known in advance the amount of current the processor is to consume).

Fuses 202 may be coupled to one or more output ports of processor 201 to indicate the IccID signal. These output ports may be coupled to a voltage V via resistors 204. As a result, an output port may be pulled to a logically high value if its associated fuse, which indicates the amount of current processor 201 consumes, is blown. If the fuse is not blown, however, the output port may be pulled to a logically low value (e.g. ground). In accordance with one embodiment, resistors 204 may be external to processor 201. For example, resistors 204 may be contained on the motherboard supporting processor 201 and voltage regulator 210. Alternatively, resistors 204 may be integrated with processor 201 or with voltage regulator 210.

In accordance with one embodiment, the IccID signal is provided from processor 201 to voltage regulator 210 via IccID signal line 203 of FIG. 2. This signal line may be a parallel signal connecting parallel output ports of processor 201 to parallel input ports of voltage regulator 210. Alternatively, signal line 203 may be a serial signal connecting serial ports.

For one embodiment, the IccID signal received at an input port of voltage regulator 210 of FIG. 2 may be used to determine a characteristic of the power supplied by voltage regulator 210 at the output port. For example, IccID may be used to determine a load line of voltage regulator 210. The IccID signal may be provided to a digital resistor 212 of controller/driver 211 of voltage regulator 210 to adjust the output resistance of the voltage regulator. A digital resistor is a circuit element, the resistance of which may be determined by a digital signal provided at its control input.

For one embodiment, the supply voltage, Vcc, provided at the output port of voltage regulator 210 of FIG. 2 is coupled to processor 201 to supply power to the processor. Vcc may also be fed back to an input of controller/driver 211 of voltage regulator 210 via a resistance ladder created by pull-up resistor 221 and pull-down resistor 222. The resistance of resistors 221 and 222 may be selected to provide an appropriate supply voltage level for supply voltage Vcc by properly setting the gain to be applied to input reference voltage Vref of controller/driver 211. In accordance with one embodiment of the present invention, processor 201 may additionally provide a VccID signal to voltage regulator 210 to indicate a specified nominal supply voltage level for the processor. This VccID signal may be used by voltage regulator 210 to adjust the resistance of resistor 222 to properly set the supply voltage level for supply voltage Vcc. For this embodiment, resistor 222 may be a digital resistor.

Figure 3:
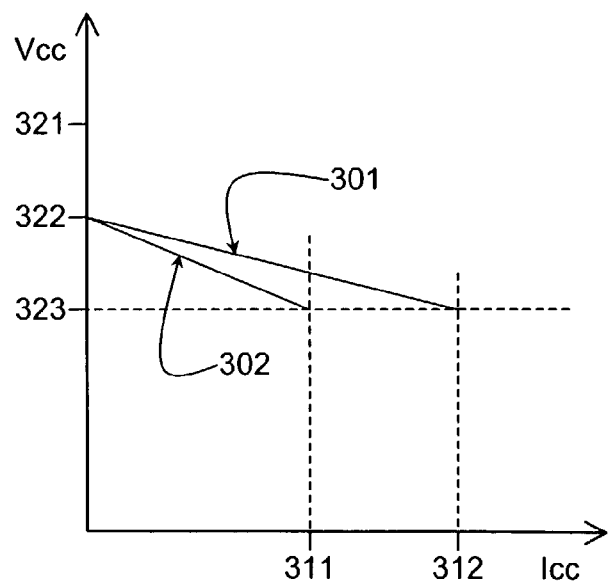
FIG. 3 includes a graph.

FIG. 3 includes a graph showing Vcc vs. Icc power characteristics of the power that may be supplied by a voltage regulator such as voltage regulator 210 of FIG. 2. Voltage level 321 may represent an upper specified supply voltage limit for a processor while voltage level 323 may represent a lower specified supply voltage limit. Voltage level 322 may represent a specified nominal supply voltage level. For example, if a processor is specified to receive a supply voltage level of 1V plus or minus 10%, then voltage level 321 may be 1.1V, voltage level 322 may be 1V, and voltage level 323 may be 0.9V.

Current level 311 of FIG. 3 may represent the amount of current a first processor consumes under a high utilization operating condition. In accordance with one embodiment, it is this amount that may be encoded in the first processor and provided to the voltage regulator as the IccID signal. Current level 312 may represent the amount of current a second processor consumes under a high utilization operating condition. In accordance with one embodiment, this amount may be encoded in the second processor and provided to the voltage regulator as the IccID signal. In accordance with an embodiment, the first and second processors may operate at the same or different operating frequencies under their respective high utilization operating conditions.

In accordance with one embodiment of the present invention, the same voltage regulator may be used to supply power to either the first or second processor described above. When used to supply power to the first processor, the first processor may send its IccID signal to the voltage regulator to adjust the load line of the voltage regulator to be the load line indicated by line 302. When used to supply power to the second processor, the second processor may send its IccID signal to the voltage regulator to adjust the load line of the voltage regulator to be the load line indicated by line 301.

Note that load lines 301 and 302 of FIG. 3 have different slopes. For this example, both the first and second processors have the same specified nominal supply voltage level and supply voltage limits. For an embodiment in which the voltage regulator supplies power to the first processor, Load line 302 may intersect the lower specified supply voltage limit 323 at current level 311 indicated by the first processor's IccID signal. For an embodiment in which the voltage regulator supplies power to the second processor, Load line 301 may intersect the lower specified supply voltage limit 323 at current level 312 indicated by the second processor's IccID signal. Both load lines may intersect the specified nominal supply voltage level at a supply current level of 0. In other words, for this embodiment, the voltage regulator may supply voltage level 322 when the processor draws little or no current, as would be the case when, for example, the processor enters a sleep state or other low power state. This small amount of current may be the leakage current of the processor.

In accordance with an embodiment of the present invention, a voltage regulator that powers a component may approximate an ideal load line by intersecting a supply voltage level within 2.5% of specified voltage levels for the component. The voltage regulator may intersect a supply current level within 10% of the current level indicated by the component's IccID signal.

Figure 4:
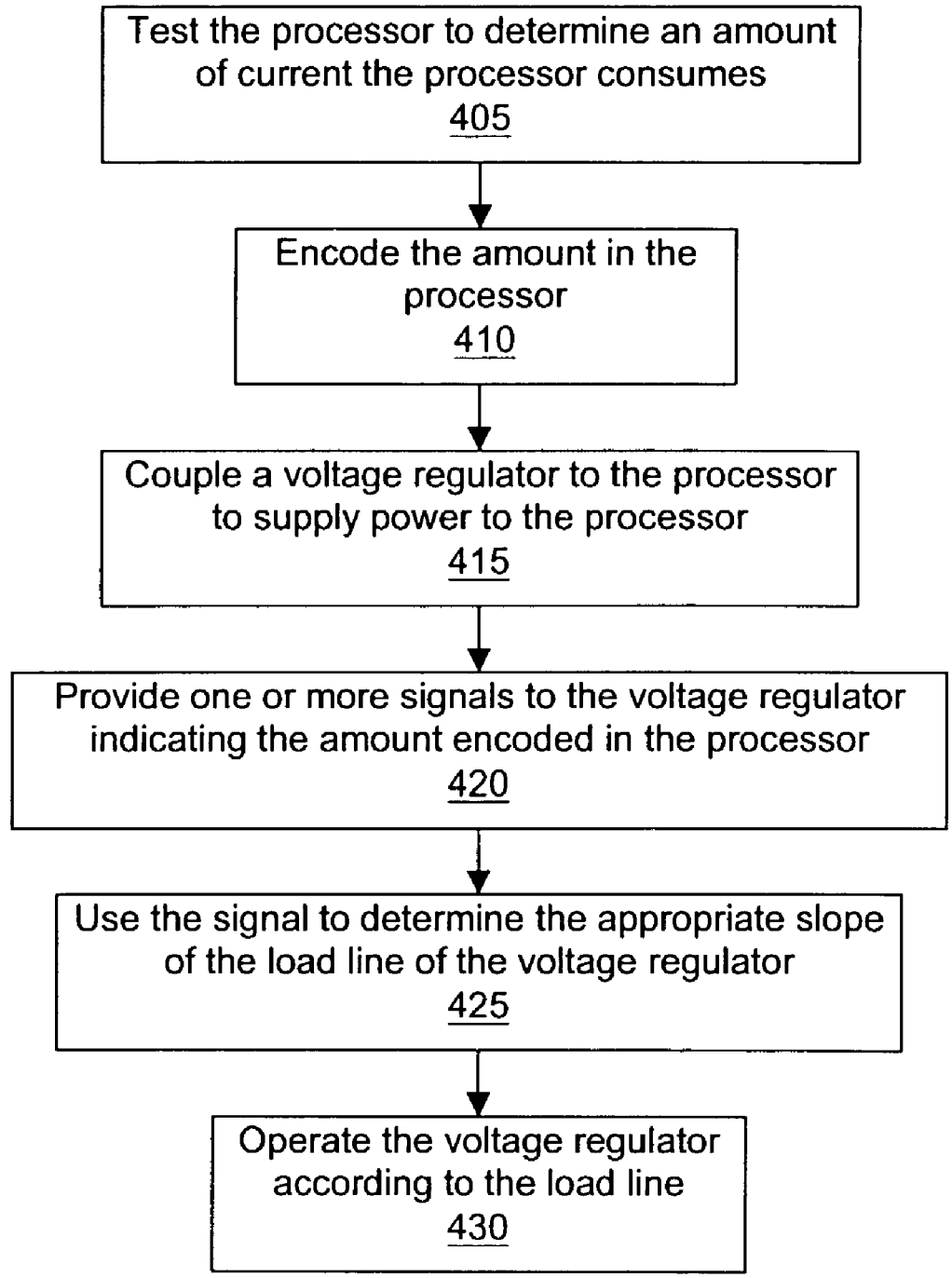
FIG. 4 includes a flow chart.

FIG. 4 includes a flow chart. At block 405, a processor may be tested to determine an amount of current the processor consumes. This testing may be done under a high utilization operating condition. The amount determined at block 405 may then be encoded in the processor at block 410 by, for example, selectively blowing a set of fuses. At block 415, a voltage regulator may be coupled to the processor to supply power to the processor. An IccID signal line, which may include one or more electrical interconnect lines, may be used to couple the processor to the voltage regulator to indicate the amount encoded in the processor at block 410.

During operation, at block 420 of FIG. 4, an IccID signal, which may comprise a set of parallel signals, may be provided to the voltage regulator. This signal indicates the amount encoded in the processor and is used by the voltage regulator, at block 425, to determine an appropriate slope of the load line of the voltage regulator. At block 430 the voltage regulator is operated according to the load line.

Embodiments have been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
    an input port to receive power from a voltage regulator;
    an output port to provide a signal to indicate an approximate amount of current the processor is to consume;
    a fuse directly connected to the output port, the fuse to be selectively blown to indicate the approximate amount of current; and
    a resistor coupled to the fuse.

2. The processor of claim 1, wherein the output port is one of a plurality of parallel output ports to provide the signal.

3. The processor of claim 1, wherein the signal is a serial signal.

4. The processor of claim 1, wherein the fuse is to be selectively blown to indicate the approximate amount of current the processor is to consume under a high utilization operating condition.

5. The processor of claim 1, wherein the output port is to provide the signal to indicate the approximate amount of current the processor is to consume under a high utilization operating condition.

6. The processor of claim 5, wherein the output port is to provide the signal to indicate the approximate amount of current the processor is to consume at a supply voltage level of the power that is approximately at a lower specified supply voltage limit for the processor.

7. The processor of claim 1, wherein the signal is to be used by the voltage regulator to determine a load line of the voltage regulator.

8. A computer system comprising:
    a component having an output port to provide a signal to indicate an approximate amount of current the component is to consume;
    a voltage regulator to supply power to the component, a characteristic of the power to be determined using the signal;
    a plurality of fuses directly connected to the output port within the component, the fuses selectively blown to indicate the approximate amount of current; and
    a plurality of resistors, each resistor coupled to its corresponding fuse.

9. The computer system of claim 8, wherein the component is a processor.

10. The computer system of claim 8, wherein the characteristic is a slope of a load line of the voltage regulator.

11. The computer system of claim 8, wherein the power is to be supplied at a supply voltage level that is approximately at a lower specified supply voltage limit for the component when the component consumes approximately the amount of current indicated by the signal.

12. The computer system of claim 11, wherein the power is to be supplied at a supply voltage level that is approximately at a specified nominal supply voltage level for the component when the component is in a sleep state.

13. The computer system of claim 11, wherein the signal is to indicate an approximate amount of current the component is to consume under a high utilization operating condition.

14. The computer system of claim 8, wherein the signal is to indicate an approximate amount of current the component is to consume under a high utilization operating condition.

15. The computer system of claim 8, wherein the voltage regulator is a switching voltage regulator.

16. A method comprising:
    coupling an output of a component to a voltage regulator to provide a signal to the voltage regulator to indicate an approximate amount of current the component is to consume;
    generating the approximate amount of current by selectively blowing a fuse directly connected to the output of the component, a resistor coupled to the fuse; and
    coupling the voltage regulator to the component to supply power to the component, a voltage level of the power to decrease to approximately a lower specified supply voltage limit for the component if the current consumed by the component increases to approximately the amount of current indicated by the signal.

17. The method of claim 16, wherein the voltage level of the power is to decrease to within 2.5% of a lower specified supply voltage limit for the component if the current consumed by the component increases to approximately the amount of current indicated by the signal.

18. The method of claim 16, wherein the voltage level of the power is to decrease to within 25 mV of a lower specified supply voltage limit for the component if the current consumed by the component increases to approximately the amount of current indicated by the signal.

19. The method of claim 16, wherein the voltage level of the power is to increase to approximately a specified nominal supply voltage level for the component if the current consumed by the component decreases to approximately zero.

* * * * *